(12) United States Patent
Grubbs et al.

(10) Patent No.: US 7,447,937 B2
(45) Date of Patent: Nov. 4, 2008

(54) METHOD FOR GENERATING SPARSE LOGICAL VOLUME MIRRORS WITHIN DATA STORAGE SYSTEMS

(75) Inventors: Mark Allen Grubbs, Round Rock, TX (US); Gerald Francis McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 10/645,041

(22) Filed: Aug. 21, 2003

(65) Prior Publication Data
US 2005/0044444 A1    Feb. 24, 2005

(51) Int. Cl.
*G06F 11/00* (2006.01)

(52) U.S. Cl. ......................................................... 714/6

(58) Field of Classification Search ....................... 714/6
See application file for complete search history.

(56) References Cited

U.S. PATENT DOCUMENTS

| | | | |
|---|---|---|---|
| 5,566,316 A * | 10/1996 | Fechner et al. ............... 711/114 |
| 6,360,306 B1 * | 3/2002 | Bergsten ...................... 711/162 |
| 6,363,462 B1 * | 3/2002 | Bergsten ...................... 711/162 |
| 6,675,278 B1 * | 1/2004 | Chowdhary et al. ......... 711/203 |
| 6,742,081 B2 * | 5/2004 | Talagala et al. ............. 711/114 |
| 7,047,359 B1 * | 5/2006 | Van Krevelen et al. ...... 711/114 |
| 7,127,633 B1 * | 10/2006 | Olson et al. .................... 714/4 |
| 2003/0056079 A1 * | 3/2003 | Shim .......................... 711/203 |
| 2004/0019822 A1 * | 1/2004 | Knapp ............................ 714/6 |

\* cited by examiner

*Primary Examiner*—Michael C Maskulinski
(74) *Attorney, Agent, or Firm*—Diana L. Gerhardt; Dillon & Yudell LLP

(57) ABSTRACT

A method for generating sparse logical volume mirrors within data storage systems is disclosed. After one of the mirrored physical volumes within a mirrored physical volume configuration has been damaged, the damaged physical volume is replaced by a replacement physical volume. Then, each partition within a sparse logical volume associated with the mirrored physical volumes is interrogated. In response to a partition within the sparse logical volume being allocated, the partition is copied to the replacement physical volume. In response to a partition within the sparse logical volume not being allocated, the partition is not copied to the replacement physical volume.

5 Claims, 7 Drawing Sheets

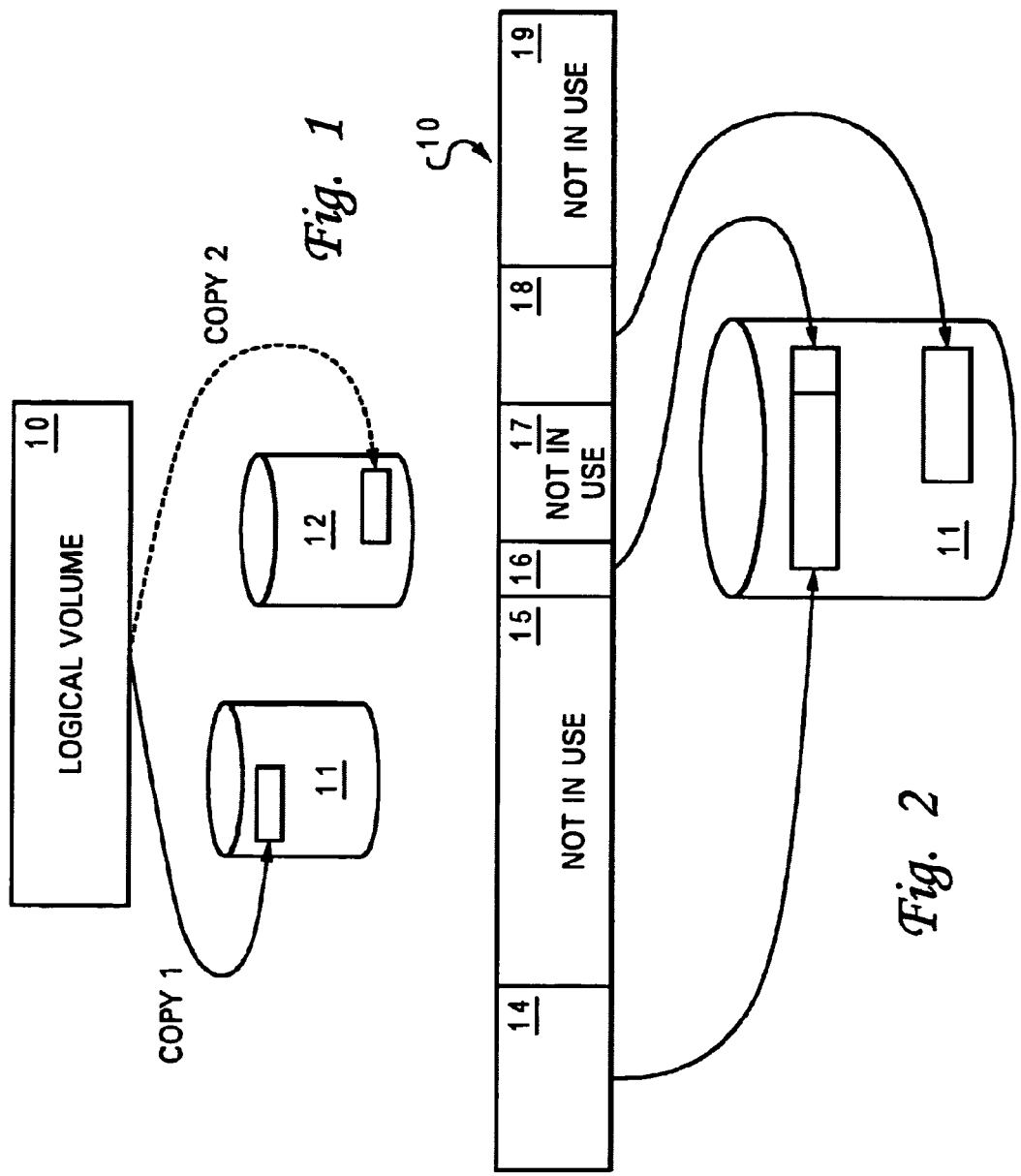

METHOD FOR GENERATING SPARSE LOGICAL VOLUME MIRRORS WITHIN DATA STORAGE SYSTEMS

BACKGROUND OF THE INVENTION

1. Technical Field

The present invention relates to data storage systems in general, and in particular, to a method for maintaining volume configuration data within data storage systems. Still more particularly, the present invention relates to a method for generating sparse logical volume mirrors within data storage systems.

2. Description of the Related Art

A logical volume is a software abstraction of the underlying storage devices. A logical volume is a self-contained unit of storage exposed by an operating system and is administered by a logical volume manager. As an abstract of the physical topology of a storage system, a logical volume may be a fraction of a physical disk, an entire physical disk or even multiple physical disks. The logical volume manager presents the logical volume as a contiguous address space regardless of composition of the underlying physical storage devices.

Volume mapping is the process of mapping the contiguous logical address space presented by the logical volume manager onto the usually non-contiguous address space of the underlying storage devices. Volume mappings can be implemented either in hardware or in software.

Volume mappings may be used to increase the fault tolerance, performance, or capacity characteristics of the underlying storage devices. For example, a technique for improving fault tolerance, known as mirroring, uses volume mapping. With mirroring, when data is written to a first disk, the data is also written to a second disk; thus, the second disk is a "mirror image" of the first disk. Should the first disk fail, the second disk is still available for use and has an exact copy of the information on the first disk.

The present disclosure provides an improved method for generating logical volume mirrors such that the process of replicating volume information can be facilitated.

SUMMARY OF THE INVENTION

In accordance with a preferred embodiment of the present invention, a method for allocating a sparse logical volume to a physical volume begins with an interrogation of a logical partition of a sparse logical volume to determine if the logical partition contains valid data. In response to a determination that the logical partition contains valid data, the logical partition is allocated to a corresponding physical partition within a physical volume. Otherwise, in response to a determination that the logical partition does not contain any valid data, the interrogating step is repeated for a next logical partition within the sparse logical volume.

The above-mentioned allocation method can be similarly performed on a mirrored physical volume configuration. During operation, if one of the mirrored physical volumes within the mirrored physical volume configuration is damaged, the damaged physical volume will be replaced by a replacement physical volume. Then, each partition within the sparse logical volume associated with the mirrored physical volumes is interrogated. In response to a partition within the sparse logical volume being allocated, the partition is copied to the replacement physical volume. In response to a partition within the sparse logical volume not being allocated, the partition is not copied to the replacement physical volume.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a graphical illustration a mirrored physical volume configuration for a logical volume, in accordance with a preferred embodiment of the present invention;

FIG. 2 is a graphical illustration of a sparse logical volume, in accordance with a preferred embodiment of the present invention;

DETAILED DESCRIPTION OF A PREFERRED EMBODIMENT

Figure 3:
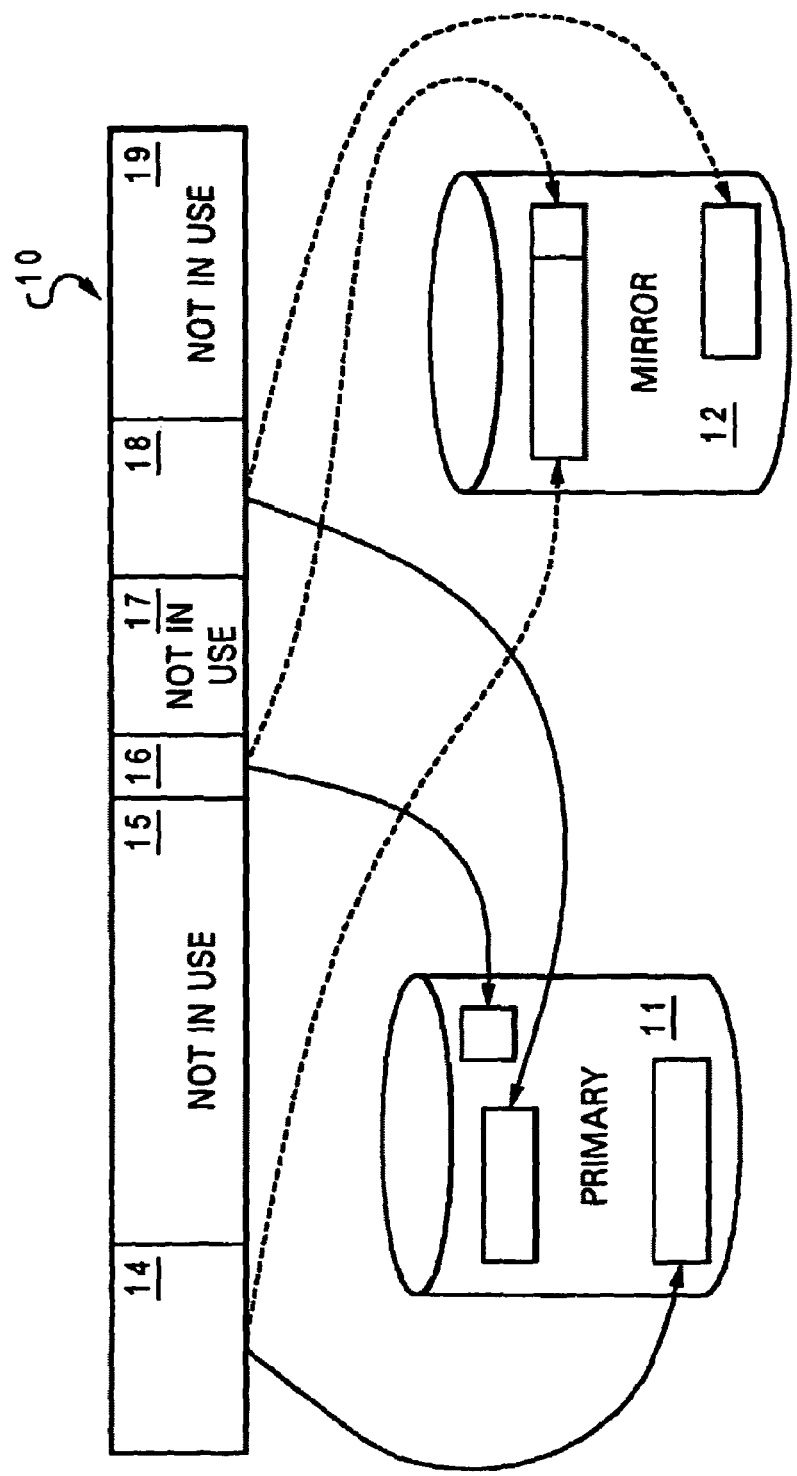
FIG. 3 is a graphical illustration of a mirrored physical volume configuration for a sparse logical volume, in accordance with a preferred embodiment of the present invention.

Referring now to the drawings and in particular to FIG. 1, there is depicted a graphical illustration a mirrored physical volume configuration for a logical volume, in accordance with a preferred embodiment of the present invention. As shown, a copy of a logical volume 10 exists in both a physical volume 11 and a physical volume 12. In other words, the copy of logical volume 10 in physical volume 12 is a replica of the copy of logical volume 10 in physical volume 11. Thus, physical volume 11 and physical volume 12 provide a mirrored physical volumes of logical volume 10. Any contributing one of physical volumes 11-12 may satisfy a read operation on logical volume 10 since the data is identical on both physical volumes 11-12. Similarly, a write to logical volume 10 causes writes operation to both physical volumes 11-12 to ensure that the data remain identical. With mirroring, loss of one physical volume does not cause any loss of data since there is another one physical volume remaining.

In the prior art, the entire logical volume must be allocated on a physical volume. In accordance with a preferred embodiment of the present invention, only the portion of a logical volume in-use at any given time is actually allocated on a physical volume, and such a logical volume can be called a sparse logical volume. With reference now to FIG. 2, there is depicted a graphical illustration of a sparse logical volume, in accordance with a preferred embodiment of the present invention. As shown, only in-use logical partitions 14, 16 and 18 of sparse logical volume 10 are allocated in physical volume 11. In contrast, not in-use logical partitions 15, 17 and 19 of logical volume 10 are not allocated in sparse physical volume 11.

When applying the concept of sparse logical volume to a mirrored physical volume configuration such as in FIG. 1, both the primary and mirror physical volumes are sparse. As shown in FIG. 3, only in-use logical partitions 14, 16 and 18 of sparse logical volume 10 are allocated in physical volume 11 and physical volume 12. In contrast, not in-use logical partitions 15, 17 and 19 of sparse logical volume 10 are not allocated in either physical volume 11 or physical volume 12.

Figure 4:
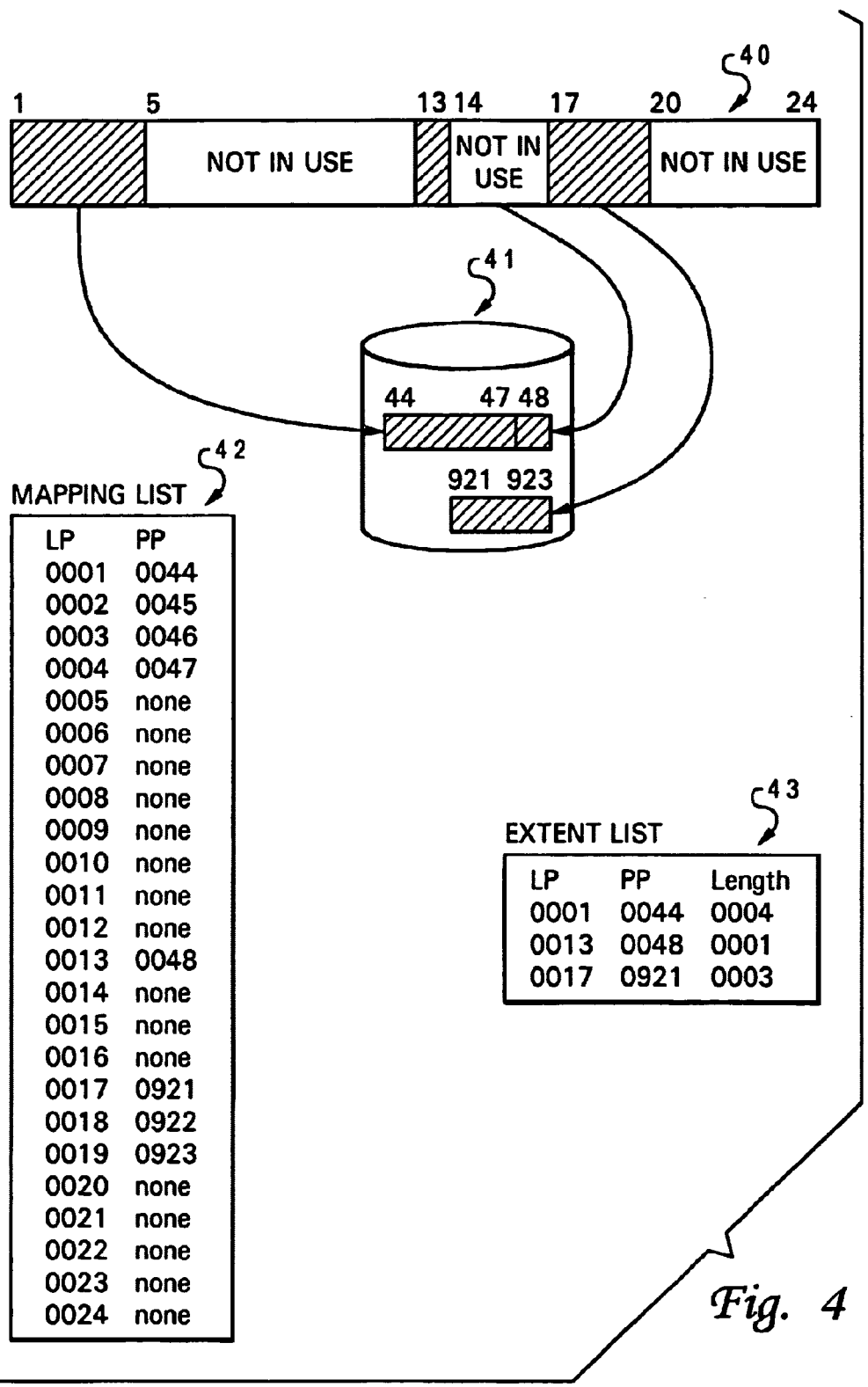
FIG. 4 is a graphical illustration of a mapping scheme for mapping a sparse logical volume, in accordance with a preferred embodiment of the present invention.

For a sparse logical volume, a mapping scheme is utilized to map all in-use logical partitions of a sparse logical volume to corresponding physical partitions allocated within a physical volume, taking into account of all not in-use logical partitions. With reference now to FIG. 4, there is depicted a graphical illustration of a mapping scheme for mapping a sparse logical volume, in accordance with a preferred embodiment of the present invention. As shown, a sparse logical volume 40 includes in-use logical partitions 1-4, 13 and 17-20. In-use logical partitions 1-4, 13 and 17-20 of sparse logical volume 40 correspond to physical partitions 44-47, 48 and 921-923 of physical volume 41, respectively. In contrast, not in-use logical partitions 5-12, 14-167 and 20-24 of sparse logical volume 40 are not allocated in physical volume 41. The relationship between logical partitions 1-4, 13 and 17-20 of sparse logical volume 40 and physical partitions 44-47, 48 and 921-923 of physical volume 41 can be recorded in a mapping list 42. Alternatively, the relationship between logical partitions 1-4, 13 and 17-20 of sparse logical volume 40 and physical partitions 44-47, 48 and 921-923 of physical volume 41 can be recorded in a relatively shorter extent list 43. Although only one physical volume is shown in FIG. 4, it is understood by those skilled in the art that the above-mentioned mapping scheme can also be applicable to a mirrored physical volume configuration having two physical volumes.

Figure 5:
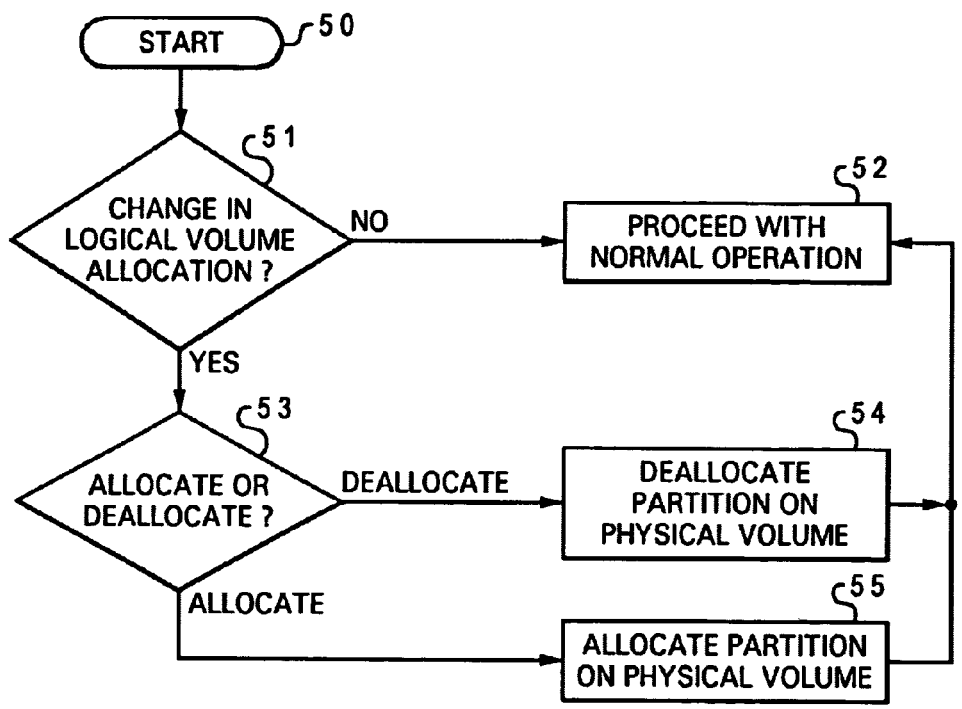
FIG. 5 is a high-level logic flow diagram of a method for allocating a sparse logical volume within a mirrored physical volume configuration, in accordance with a preferred embodiment of the present invention.

Referring now to FIG. 5, there is illustrated a high-level logic flow diagram of a method for allocating a sparse logical volume within a mirrored physical volumes configuration, in accordance with a preferred embodiment of the present invention. Starting at block 50, a determination is made as to whether or not there is a change in a logical volume allocation, as shown in block 51. A change in the logical volume allocation may include an addition of a new allocation or a deletion of an existing allocation. If there is no change in the logical volume allocation, the process proceeds with normal operation, as normal operation, as depicted in block 52. But if there is a change in the logical volume allocation, another determination is made as to whether or not the change is an allocation or a deallocation, as shown in block 53. If the change is a deallocation, then the corresponding partition is deallocated from the mirrored physical volumes, as depicted in block 54, and the process proceeds with normal operations, as shown in block 52. If the change is an allocation, then the corresponding partition is allocated within the mirrored physical volumes, as depicted in block 55, and the process proceeds with normal operations, as shown in block 52.

Figure 6:
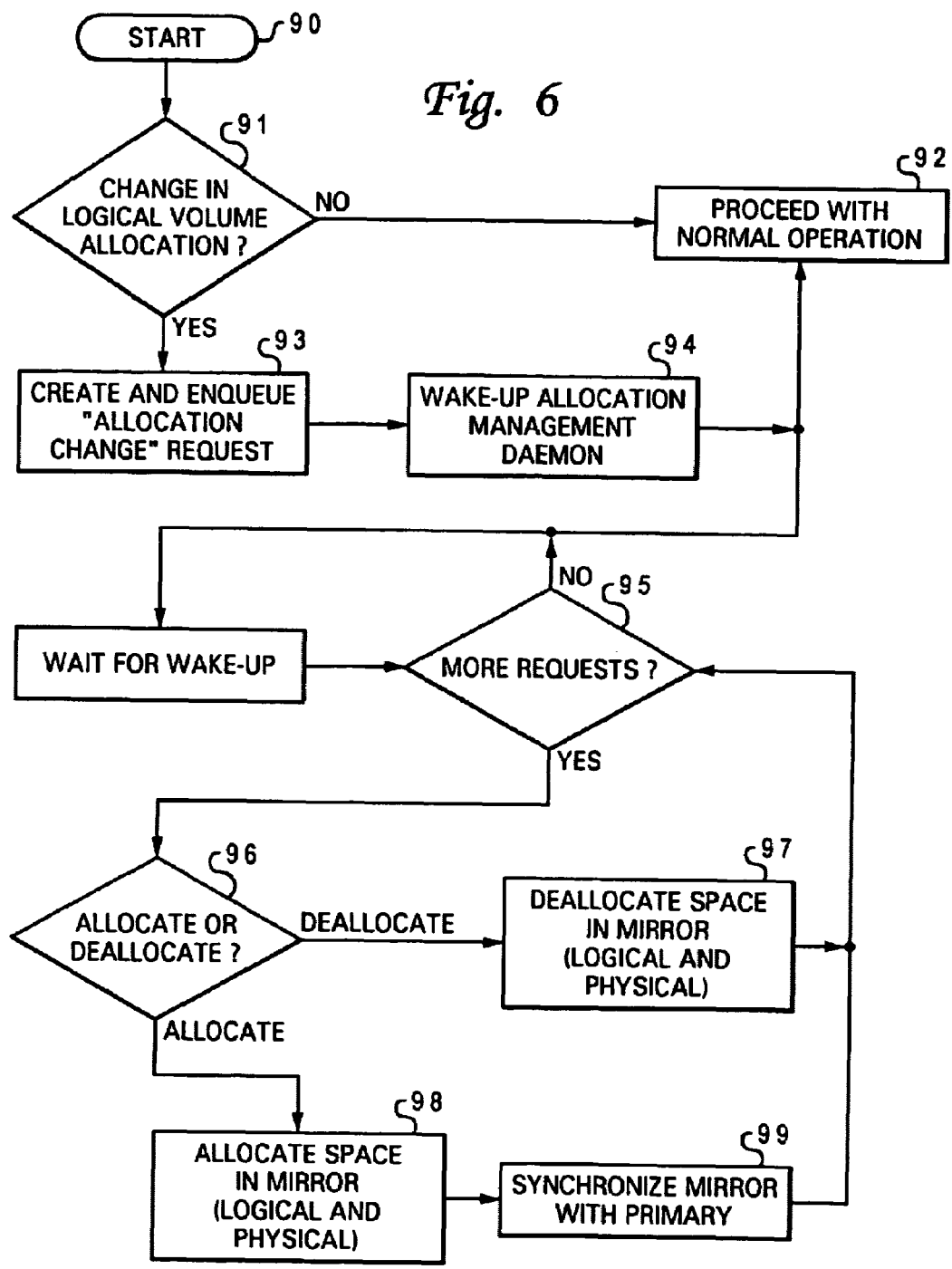
FIG. 6 is a high-level logic flow diagram of a method for synchronizing a sparse logical volume within a mirrored physical volume configuration after the failure of one of the mirrored physical volumes, in accordance with a preferred embodiment of the present invention.

With reference now to FIG. 6, there is illustrated a high-level logic flow diagram of a method for asynchronously allocating a sparse logical volume within a mirrored physical volumes configuration, in accordance with a preferred embodiment of the present invention. Starting at block 90, a determination is made as to whether or not there is a change in a logical volume allocation, as shown in block 91. If there is no change in the logical volume allocation, the process proceeds with normal operations, as depicted in block 92. But if there is a change in the logical volume allocation, an allocation change request is generated and enqueued, as shown in block 93, and the allocation management daemon is woken up, as depicted in block 94. At this point, the process can proceed with normal operations, as depicted in block 92; but at the same time, another determination is made as to whether or not the change is an allocation or a deallocation, as shown in block 96. If the change is a deallocation, then the corresponding partition is deallocated from the mirrored physical volumes, as depicted in block 97, and the process proceeds to inquire if there are any more requests, as shown in block 95. If the change is an allocation, then the corresponding partition is allocated within the mirrored physical volumes, as depicted in block 93, and the both physical volumes are synchronized, as shown in block 99, before the process proceeds to inquire if there are any more requests, as shown in block 95.

Figure 7:
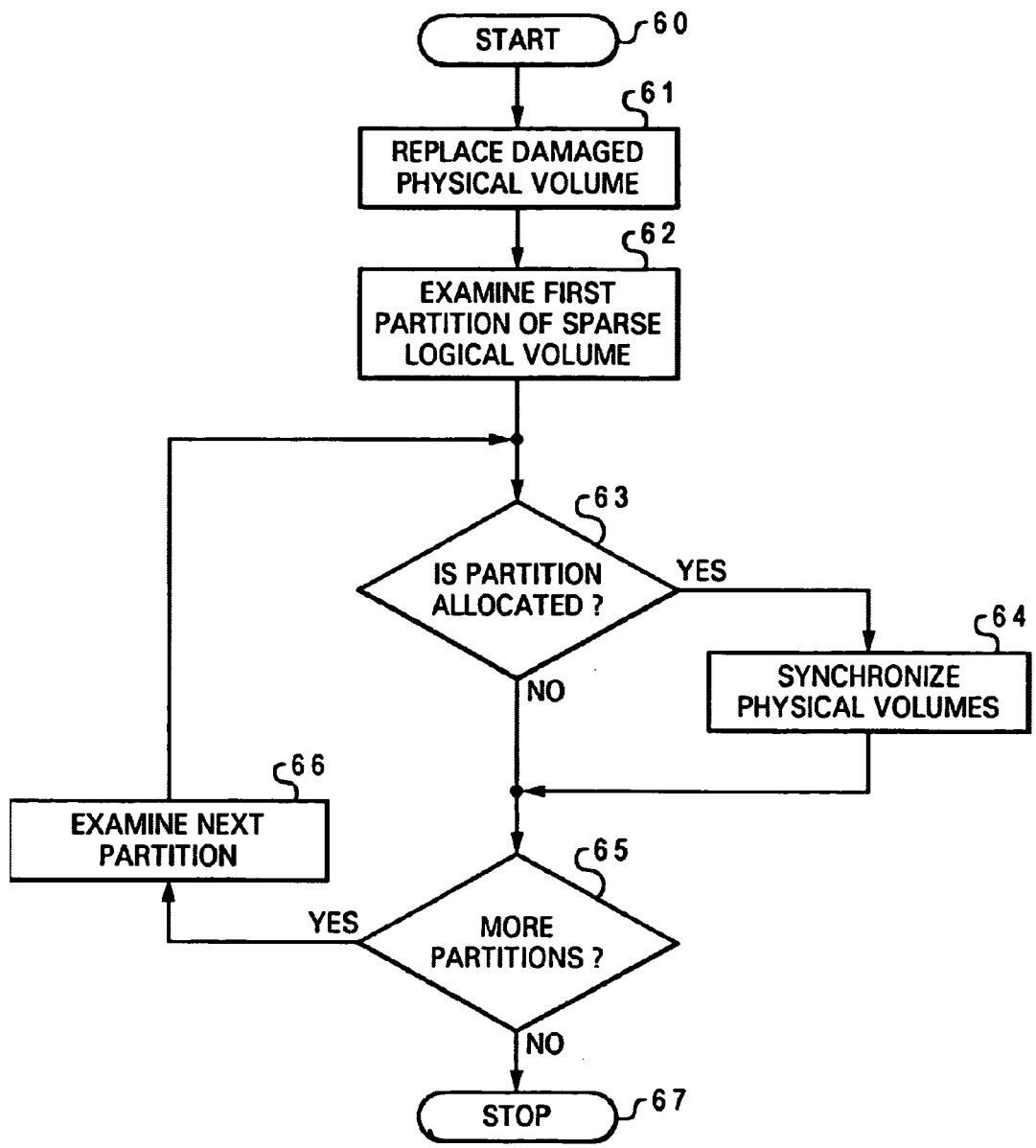
FIG. 7 is a high-level logic flow diagram of a method for synchronizing a sparse logical volume within a mirrored physical volume configuration after the failure of one of the mirrored physical volumes, in accordance with a preferred embodiment of the present invention.

Referring now to FIG. 7, there is depicted a high-level logic flow diagram of a method for synchronizing a sparse logical volume within a mirrored physical volume configuration after the failure of one of the mirrored physical volumes, in accordance with a preferred embodiment of the present invention. Starting at block 60, the damaged physical volume is replaced by a new physical volume, as shown in block 61. Then, the first partition of the sparse logical volume is initially examined, as depicted in block 62. A determination is made as to whether or not the partition of the sparse logical volume is allocated (based on a map list or an extent list illustrated in FIG. 4), as shown in block 63. If the partition of the sparse logical volume is allocated, a synchronization is performed between the two physical volumes, as depicted in block 64. The synchronization can be performed by copying the partition from the sparse logical volume to the new physical volume. Alternatively, the synchronization can be performed by copying the partition from the non-damaged physical volume to the new physical volume. After the completion of the synchronization or if the partition of the sparse logical volume is not allocated, another determination is made as to whether or not there is any more partition remaining in the sparse logic volume, as shown in block 65. If there are more partitions remaining in the sparse logic volume, then the next partition is examined, as depicted in block 66. But if there is no more partition remaining in the sparse logic volume, then the process stops, as shown in block 67.

As has been described, the present invention provides a method for generating sparse logical volume mirrors within a data storage system. With the present invention, only allocated partitions within a sparse logical volume of a mirrored physical volume configuration will be copied from one physical volume to a replacement physical volume, in the event of a failure of one of the physical volumes. In other words, non-allocated partitions within the sparse logical volume will not be copied to the replacement physical volume. As such, the rebuilding time of the replacement physical volume is drastically reduced when compared to the prior art method.

Figure 8:
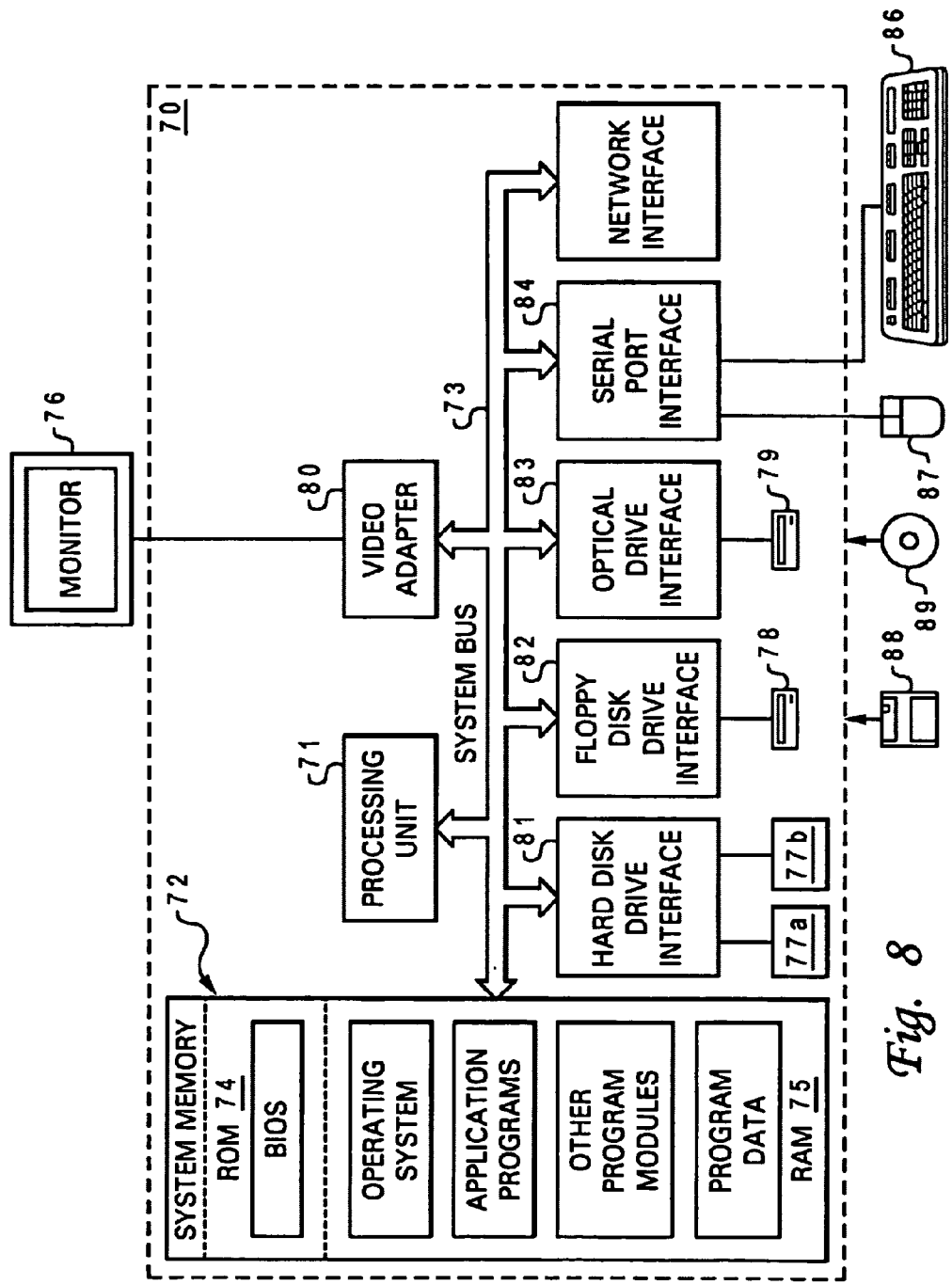
FIG. 8 is a block diagram of a computer system in which a preferred embodiment of the present invention is incorporated.

With reference now to FIG. 8, there is depicted a block diagram of a computer system in which a preferred embodiment of the present invention is incorporated. As shown, a computer system 70 includes a processing unit 71, a system memory 72, and a system bus 73 that operatively couples various system components to processing unit 71. System bus 73 can be any type of bus structures including a memory bus, a peripheral bus, and a local bus. System memory 72 includes a read-only memory (ROM) 74 and random access memory (RAM) 75. ROM 74 contains a basic input/output system (BIOS) having routines to assist transferring information between elements within computer system 70 during system start-up.

Computer system 70 further includes hard disk drives 77a-77b, a floppy disk drive 78 for reading from or writing to a floppy disk 88, and an optical disk drive 79 for reading from or writing to an optical disk 89. Hard disk drives 77a-77b, floppy disk drive 78, and optical disk drive 79 are connected to system bus 73 via a hard disk drive interface 81, a floppy disk drive interface 82, and an optical disk drive interface 83, respectively.

A number of program modules may be stored on hard disk drives 77a-77b, floppy disk 88, optical disk 89, ROM 74, and/or RAM 75, including an operating system, one or more application programs, and program data. A user may enter commands and information into computer system 70 through input devices such as a keyboard 86 and a pointing device 87. Keyboard 86 and pointing device 87 are connected to processing unit 71 through a serial port interface 84 that is coupled to system bus 73. A monitor 76 is connected to system bus 73 via a video adapter 80. In addition to monitor 76, computer system 70 may also include other peripheral output devices such as speakers and printers (not shown).

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for synchronizing a sparse logical volume within a mirrored physical volume configuration after one of said mirrored physical volumes has been damaged, said method comprising:
   replacing said damaged physical volume with a replacement physical volume;
   interrogating a partition within said sparse logical volume;
   in response to said partition within said sparse logical volume being allocated, copying said partition to said replacement physical volume and returning to said interrogating until all partitions within said sparse logical volume have been interrogated; and
   in response to said partition within said sparse logical volume not being allocated, returning to said interrogating until all partitions within said sparse logical volume have been interrogated.

2. The method of claim 1, wherein said method further includes allocating only in-use partitions of said sparse logical volume in said mirrored physical volumes.

3. The method of claim 1, wherein said method further includes recording the relationship between partitions within said sparse logical volume and partitions within said mirrored physical volumes in a mapping list.

4. The method of claim 1, wherein said method further includes recording the relationship between partitions within said sparse logical volume and partitions within said mirrored physical volumes in an extent list.

5. The method of claim 1, wherein said copying comprises:
   copying to storage in said physical partition for only storage locations in said logical partition that contain valid data; and
   not copying to storage in said physical partition for storage locations in said logical partition that do not contain valid data.

\* \* \* \* \*